United States Patent [19]

Herbst et al.

[11] 3,955,257
[45] May 11, 1976

[54] REVOLVING TOOL HOLDER FOR A ROTARY MACHINE SUCH AS A LATHE OR DRILL

[75] Inventors: Friedrich-Wilhelm Herbst; Hans-Joachim Koch, both of Hannover; Wolfgang Schaefer, Langenhagen; Dieter Schneider, Langenhagen; Kurt Schünhoff, Langenhagen; Friedrich Ullrich, Garbsen; Arnold Wesche, Schulenberg, all of Germany

[73] Assignee: Max Muller Brinker Maschinenfabrik Zweigniederlassung der Gildemeister Aktiengesellschaft, Bielefeld, Langenhagen, Germany

[22] Filed: July 3, 1975

[21] Appl. No.: 593,063

[30] Foreign Application Priority Data

July 26, 1974 Germany............................ 2436220

[52] U.S. Cl............................................ 29/36; 29/40; 82/36 A; 408/35
[51] Int. Cl.²......................................... B23B 3/18
[58] Field of Search............ 29/36, 39, 40; 82/36 A; 408/35

[56] References Cited
UNITED STATES PATENTS

| 2,685,122 | 8/1954 | Berthiez | 408/35 X |
| 3,259,958 | 7/1966 | Lemelson | 408/35 X |
| 3,762,036 | 10/1973 | Goebel | 408/35 X |

Primary Examiner—Othell M. Simpson
Assistant Examiner—W. R. Briggs
Attorney, Agent, or Firm—Owen, Wickersham & Erickson

[57] ABSTRACT

A turret head for a rotary turning machine having a base rotatably mounted on a cross-slide for movement about a first axis. The turret head is mounted to the base for rotatable movement relative thereto about a second axis that is inclined to the first axis by an angle α. The turret head includes two rings or annular arrays of tool holders. Each ring has its tools disposed so that their axes lie on the surface of an imaginary cone having a vertex angle of 2β, such that α + β = 90°. The two imaginary cones have their axes coincide with the second axis and preferably the vertices of the cones coincide, so that the cones are mirror images of each other.

10 Claims, 4 Drawing Figures

REVOLVING TOOL HOLDER FOR A ROTARY MACHINE SUCH AS A LATHE OR DRILL

BACKGROUND OF THE INVENTION

The invention relates to a revolving tool holder or turret for use in or with a rotary machine, such as a lathe or drill.

The type of tool holder with which this invention is concerned has a base member disposed on the cross-slide rest of the rotary machine, the base member being rotatable in relation to the cross-slide rest about a first axis of rotation; the rotary head or turret head is disposed on the base member, and it rotates about a second axis of rotation, which is inclined to the first axis of rotation by an offset angle.

The rotary head has two rings of tools, including a first ring of tools whose shank axes lie on the surface of an imaginary cone, the vertex of which lies on the second axis of rotation, the vertex angle of the cone when bisected and added to the angle of offset, resulting in a right angle.

It is known to provide the second ring of tools on a separate rotary head. The axis of rotation of this second rotary head lies at a right angle to the rotary axis of the firstmentioned rotary head. The second rotary head of this prior-art device requires a separate rotational device.

An important object of the invention is to simplify the construction of the above-described rotary head.

SUMMARY OF THE INVENTION

The problem is solved, according to the present invention, (1) by providing both rings of tools on a single rotary head, and (2) disposing the shank axes of the tools of the second ring so that they lie on the surface of a second imaginary cone whose (a) vertex is directed against or coincides with the vertex of the cone of the first ring and whose (b) cone axis coincides with the cone axis of the first ring, and (c) with a structure such that the vertex angles of the cones of the two rings are identical.

The rotary head of the present invention distinguishes over the above-described known rotary head by dispensing with the second rotary head. Moreover, only one rotational drive is required for the single rotary head. Basically, the offset angle between the two rotational axes and the arrangement of the tools on a conical surface enables the tools of the second ring also to be disposed on a conical surface, this one being mirror-symmetrical to the conical surface of the first ring.

The rotary head of the present invention makes it possible to equip each of the two rings with cutting as well as drilling tools. Conveniently, one of the rings or annular arrays may be provided with turning tools and the other ring or annular array may be provided with drilling tools. The exchange of the tools of one ring for those of the other ring is accomplished by rotating the base member 180° about the first rotational axis. The exchange between the different tools of any ring is accomplished by rotating the rotary head about the second rotational axis. In this connection, it should also be mentioned that a rotary head is known in which the base member and the rotary head are fixedly connected together and revolve only about a single rotational axis. The base member of this prior-art device has a ring of receiving devices for drilling tools, and the rotary head has a ring for cutting tools. An exchange from the tools of one ring to those of the other ring can be accomplished there only by moving the sliding carriage.

In a further practical development of the invention, the shank axes of the tools of the first ring may be angularly offset in relation to the shank axes of the tools of the second ring, with the rotary head being viewed along the second rotational axis. As a result, the individual tools have maximal freedom from collision. It is most advantageous to select the angular offset of the shank axes of the tools of both rings so that a uniform angle of graduation or spacing is obtained.

Two embodiments of the invention are described hereinbelow in connection with the drawings.

DESCRIPTION OF SOME PREFERRED EMBODIMENTS

Figure 1:
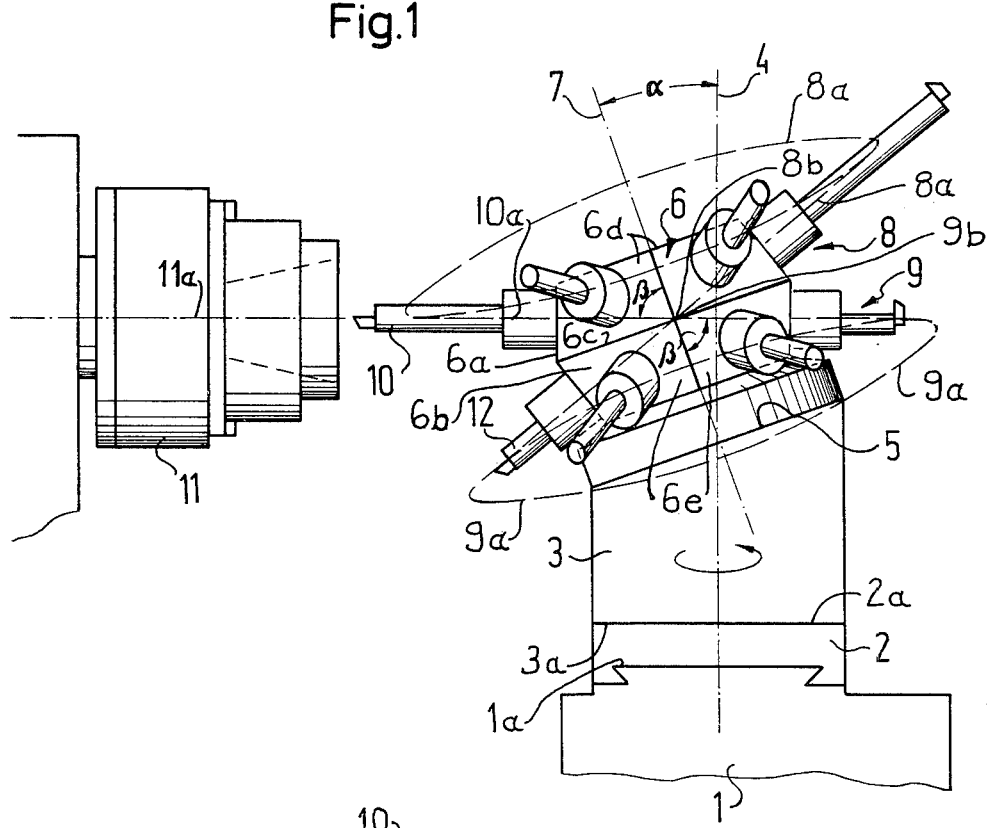
FIG. 1 is a simplified view in side elevation of portions of a rotary machine (a lathe) having a chuck and having a rotary turret head embodying the principles of the invention. Two imaginary cones with a common vertex point are shown in broken lines, and various axes are indicated in broken lines.
Figure 1A:
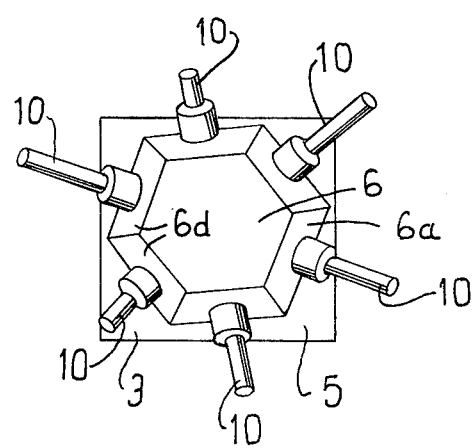
FIG. 1A is a view of the turret head assembly of FIG. 1 as viewed from above along the rotary axis of the turret head.
Figure 2:
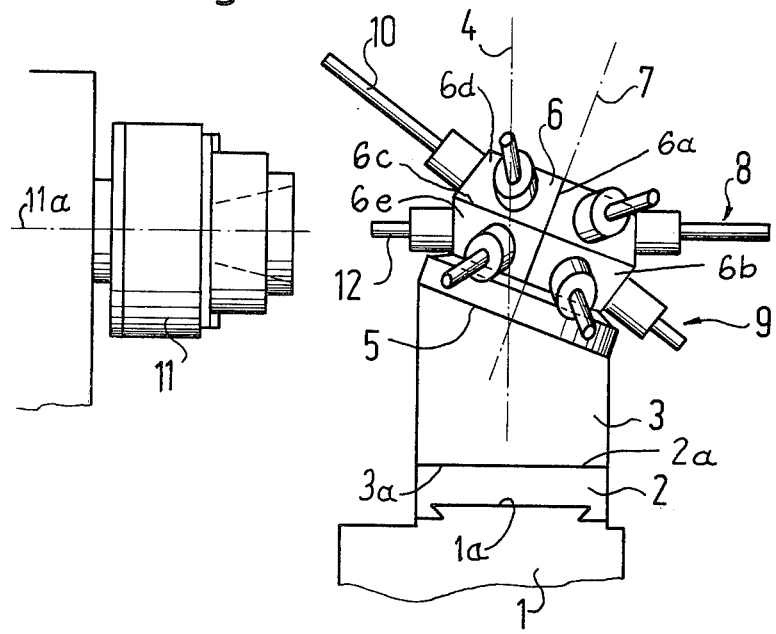
FIG. 2 is a view similar to FIG. 1 where the base member has been rotated 180° about the first or vertical axis of the base member.

FIG. 1, 1A and 2 show, in somewhat fragmentary form, a lathe having a bed carriage 1 on the upper planar surface 1a of which is displaceably supported a cross-slide rest 2. On an horizontal upper surface 2a of the cross-slide rest 2 is mounted a base member 3 which is rotatable about a vertical rotational axis 4, normal to the plane of the bed carriage 1. The base member 3 may be prismatic, as shown here, its lower surface 3a being horizontal, and its upper surface 5 lying in a plane inclined to the horizontal.

A rotary turret head 6 rests on the inclined surface 5 of the base member 3 and is rotatable about a second rotational axis 7. The second rotational axis 7 is thus inclined to the first rotational axis 4, and the two axes 4 and 7 define between them an angle $\alpha$ of offset. As shown in FIGS. 1, 1A, and 2, the turret head 6 comprises two truncated hexagonal pyramids 6a and 6b with a common base 6c, preferably made as an integral member, and having inclined surfaces 6d and 6e.

Two annular arrays of tool holders, or tool rings, 8 and 9 are provided on the turret head 6. Each of a set of tools 10 is so arranged that the axis 10a of each tool 10 lies on the surface of an imaginary cone 8a, shown in broken lines in FIG. 1; the vertex 8b, which points downwardly, lies on the axis 7, for the axis of the cone 8a coincides with the rotational axis 7. The axis 7 accordingly bisects the vertex angle of the cone 8a and forms with the conical surface an angle $\beta$ which is equal to half the vertex angle. The sum of the angle $\beta$ plus the offset angle $\alpha$ is a right angle; in other words, $\alpha + \beta = 90°$. As a result, the tool 10 pointing to the left of the upper ring 8 extends parallel to the plane 1a of the carriage 1. In the illustrated example, the shank axis of the tool 10 pointing to the left toward a rotating chuck 11 is aligned also with the rotational axis 11a of the rotating chuck 11.

A second set of tools 12 is supported by the lower ring 9 of the turret head 6. The vertex angle of an imaginary cone 9a having its vertex 9b coincide with the vertex 8b of the cone 8a and lying along the same axis 7. The vertex angle of the cone 9a is identical in value to that of the cone 8a, and the angle $\beta$ again is one-half of the vertex angle.

When a tool 12 is to be used in place of a tool 10 in the lathe shown, the prismatic base member 3 is rotated 180° about its axis 4. Aligning means or stops may be provided as desired. The actual securing of the cross-slide rest 2 to the bed carriage 1 and to the prismatic base member 3 is of the usual type, and is not therefore illustrated in detail. The same is true of the mounting of the rotary turret head 6 on the base member 5 and of the tools 10 and 12.

Figure 3:
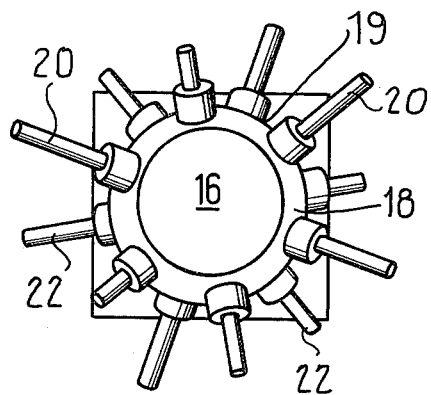
FIG. 3 is a view in projection along the second or inclined axis of a modified form of rotary head in which the tools of both rings are angularly circumferentially offset in relation to each other.

In FIGS. 1, 1A and 2, each tool 12 lies directly below a tool 10, but the disposition may be alternating as shown in FIG. 3. In FIG. 3 tools 20 of an upper ring 18 may be angularly offset, around the circumference of a frustoconical head 16, in relation to tools 22 of a lower ring 19, with the offset preferably so selected that a uniform spacing angle obtains.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a tool-holding turret for a rotary machine, such as a lathe, having a base member disposed on a cross-slide rest and rotatable in relation thereto about a first axis of rotation, a rotary turret head being disposed on said base member, and rotating about a second axis of rotation, inclined to said first axis of rotation at an offset angle, the improvement wherein said turret head has a first ring of tools and a second ring of tools, each said ring having the shank axis of its tools lying on the conical surface of an imaginary cone, there being a separate cone for each said ring, the cones being mirror images of each other; the vertices of the two cones coinciding and both lying on the said second axis of rotation, the sum of half the vertex angle of the cone plus the offset angle of said second axis from said first axis being a right angle.

2. A tool-holding turret in accordance with claim 1 in which the shank axes of the tools of said first ring are circumferentially angularly offset in relation to the shank axes of the tools of said second ring, as viewed along said second axis of rotation.

3. A tool-holding turret in accordance with claim 2, wherein the angular circumferential offset is uniformly graduated.

4. A tool-holding turret according to claim 1 wherein said turret comprises two truncated pyramids with a common base.

5. A tool-holding turret according to claim 1 wherein said turret comprises two truncated cones with a common base.

6. A turret for a turning machine, comprising:
   a base member arranged rotatably on the cross-slide rest and rotatable relative thereto about a first rotational axis,
   a turret head arranged rotatably on the base member, said turret head being rotatable about a second axis of rotation which defines an offset angle with the first axis of rotation, said turret-head having
   a first ring of tools the shank axes of which lies on the surface of an imaginary cone, with the vertex of the cone lying on the second axis of rotation and with half the vertex angle of the cone plus the offset angle forming a right angle, and
   a second ring of tools, the shank axes of which lie on the surface of a second imaginary cone the inclination of which is directed towards the vertex of the cone of said first ring and the axis of both said cones being identical and lying on said second axis of rotation, both said cones having identical vertex angles.

7. A turret for a rotary turning machine having a cross-slide, comprising:
   a base mountable on said cross-slide for rotary movement about a first axis,
   a turret head arranged on said base for pivotal movement relative to the base about a second axis inclined at an angle $\alpha$ to said first axis,
   a first annular array of tool holders provided on said turret head and arranged whereby, when tools are mounted in said holders, the axes of the tools are located on the surface of an imaginary cone having its vertex located on said second axis, and the arrangement of the turret head being such that $\alpha + \beta = 90°$ where $2\beta$ is the angle defined at the vertex of the cone, and
   a second annular array of tool holders provided on said turret head and arranged whereby, when tools are mounted in said holders, the axes of the tools are located on the surface of a further imaginary cone having its vertex directed towards the vertex of said first mentioned cone and also located on said second axis, said further cone having a vertex angle which is equal to the vertex angle of said first mentioned cone.

8. A turret according to claim 7, in which the tool holders of said first and second annular arrays are so arranged that, when tools are mounted therein, as viewed in the direction of said second axis, the tools in said first array are angularly offset relative to the tools in said second array.

9. A turret according to claim 8, in which the angular offsetting between successive tools of the first and second arrays, as viewed in the direction of said second axis, is such as to provide a uniform pitch.

10. A turret according to any one of the preceding claims, in which the vertices of said cones are coincident.

* * * * *